3,307,929
METHOD OF MANUFACTURING GLASS
Hendrikus Johan Lodewijk Trap, Emmasingel, Eindhoven, Netherlands, assignor to North American Philips Company, Inc., New York, N.Y., a corporation of Delaware
No Drawing. Filed May 27, 1964, Ser. No. 370,709
Claims priority, application Netherlands, June 28, 1963, 294,727
3 Claims. (Cl. 65—32)

The invention relates to a method of manufacturing glass which with a view to the specific electric conductivity offers interesting possibilities.

In addition to electrically conductive sintered materials also electrically conductive vitreous materials are known. These known materials contain ferric ions in addition to bivalent ions, for example ferrous ions. From a technological point of view the vitreous materials are to be preferred, that is to say as far as the shape is concerned the number of possibilities is far less restricted than in the case of sintered materials.

These known electrically conductive vitreous materials may be manufactured in a reproducible manner with values of the resistivity in the range of from $10^3$–$10^5$ ohm cm. and in the range of $10^{12}$ ohm cm. and higher. However, a drawback is that glasses in the range of resistivity values lying in between these values, in particular with values between $10^7$–$10^{12}$ ohm cm., which are important for some applications, for example, as a coating for high-voltage insulators, for checking the electrostatic charging, cannot be obtained in a reproducible manner. If a number of glasses is prepared with an increasing ferric-ferrous content and with equal other glass components, for example in the same molecular ratio, a sudden transition of values from $10^3$–$10^5$ ohm cm. to values of $10^{12}$ ohm cm. and higher is found.

The invention provides a method of manufacturing glass which contains ferric ions in addition to ferrous ions, with which the above range can be obtained in a reproducible manner, and in addition the resulting glasses comprise compositions with a low resistivity value which are also interesting for practical uses.

The invention is characterized in that a mixture of the following composition in mol percent, indicated as oxides, the total amount of ferric oxide and ferrous oxide being calculated as $Fe_3O_4$:

$B_2O_3$ ---------------------------------- 35–80
$Fe_3O_4$ --------------------------------- 1–20
$Al_2O_3$ --------------------------------- 2–15
$Na_2O$ ---------------------------------- 5–20
$PbO$ ------------------------------------ 5–20 where $$0.3 < \frac{PbO}{Na_2O} < 3.3$$

is melted in an inert to weakly oxidizing atmosphere.

In the composition of the mixture preferably as many hydrous components as possible are chosen. For example, $B_2O_3$ is added in the form of boric acid, $Al_2O_3$ in the form of hydrous alumina and $Na_2O$ in the form of soda crystals ($Na_2CO_3 \cdot 10H_2O$). This water is absorbed in the lattice of the glass; in which form this occurs cannot yet be said with certainty.

If the mixture is composed of hydrous components, it is found that the range of glass formation is much wider than when an anhydrous mixture is used as the starting material. In addition, the viscous properties are much more favorable.

The term "weakly oxidizing atmosphere" is understood to mean, for example, a mixture of hydrogen and oxygen with a 10% by volume excess of oxygen which is used as a fuel for melting.

Glasses with a reproducible value of the resistivity in the range of from $10^7$–$10^{12}$ ohm cm. are obtained when the mixture is composed as follows, likewise in mol percent:

$B_2O_3$ ---------------------------------- 50–75
$\left.\begin{array}{l}Fe_3O_4\text{—}1.5\text{–}6 \\ Al_2O_3\text{—}3\text{–}15\end{array}\right\} Al_2O_3 + Fe_3O_4$ ---------- 5–15
$PbO$ ------------------------------------ 5–20
$Na_2O$ ---------------------------------- 5–20 where $$PbO \leqslant 4 Fe_3O_4$$

The ferous oxide and the ferric oxide may be added to the mixture as magnetite ($Fe_3O_4$) but also as a mixture of a ferrous and a ferric compound, for example as oxalates. The ratio of the ferrous and ferric compounds in the mixture is not particularly critical. During melting the mixture the correct ratio which lies between 1:2 and 4:1 automatically adjusts. It is surprising that the melting atmosphere, between weakly oxidizing in the above sense and inert, has substantially no influence on the value of the resistivity.

In order that the invention may readily be carried into effect, it will now be described more fully, with reference to the details of the preparation of some of such glasses.

The mixture was composed of boric acid, ferrous oxalate and ferric oxide in equimolecular quantities, hydrous alumina, red lead ($Pb_3O_4$) and soda crystals ($Na_2CO_3 \cdot 10H_2O$) and melted in a weakly oxidizing atmosphere at temperatures varying between 950 and 1150° C. Tempering was carried out at a temperature between 525 and 600° C.

In the table below is stated the composition of the mixture expressed in the oxides, the total amount of iron being converted to $Fe_3O_4$. In addition the table shows the value of $\log \rho$ at 200° C. ($\rho$ being the resistivity in ohm cm.) and the activation energy for the electric conductivity Q in e.v. The composition of the mixture in percent by weight is also stated. Since boric

TABLE

| Composition in mol percent | | | | | Composition in percent by weight | | | | | $\log \rho$ 200° C. | Q (e.v.) |
|---|---|---|---|---|---|---|---|---|---|---|---|
| $B_2O_3$ | $Al_2O_3$ | $Na_2O$ | $Fe_3O_4$ | $PbO$ | $B_2O_3$ | $Al_2O_3$ | $Na_2O$ | $Fe_3O_4$ | $PbO$ | | |
| 40 | 13.3 | 20 | 16.7 | 10 | 24.4 | 11.8 | 10.8 | 33.6 | 19.4 | 1.86 | 0.06 |
| 55 | 10 | 15 | 12.5 | 7.5 | 37.1 | 9.8 | 9.0 | 28.0 | 16.1 | 3.85 | 0.15 |
| 70 | 6.7 | 10 | 8.3 | 5 | 53.0 | 7.3 | 6.7 | 20.9 | 12.1 | 4.75 | 0.25 |
| 70 | 10 | 8.3 | 1.7 | 10 | 54.1 | 11.3 | 5.7 | 4.3 | 24.6 | 11.26 | 1.15 |
| 55 | 10 | 10 | 5 | 20 | 34.7 | 9.2 | 5.6 | 10.4 | 40.1 | 7.50 | 0.26 |
| 70 | 6.7 | 6.7 | 3.3 | 13.3 | 50.3 | 7.0 | 4.3 | 7.9 | 30.5 | 8.71 | 0.48 |
| 79 | 4.7 | 4.7 | 2.3 | 9.3 | 62.0 | 5.3 | 3.3 | 6.1 | 23.3 | 11.33 | 2.87 |
| 70 | 6.7 | 6.7 | 3.3 | 10 | 53.2 | 7.4 | 6.7 | 8.4 | 24.2 | 10.54 | 0.92 |
| 79 | 4.7 | 4.7 | 2.3 | 7 | 64.7 | 5.6 | 5.1 | 6.3 | 18.3 | 12.81 | 2.42 |
| 70 | 6.7 | 6.7 | 5 | 5 | 56.5 | 7.8 | 9.5 | 13.4 | 12.8 | 9.29 | 0.88 |
| 55 | 10 | 10 | 2.5 | 7.5 | 44.4 | 11.7 | 17.9 | 6.7 | 19.3 | 7.93 | 0.83 |
| 70 | 6.7 | 6.7 | 1.7 | 5 | 60.4 | 8.4 | 12.7 | 4.8 | 13.7 | 9.06 | 0.86 | acid is volatile with water vapour and lead oxide as such also, the glass has a composition which differs somewhat from that of the mixture; this is maximally 3% by weight of each of the two components.

From this table appears the ready reproducibility of the desired resistivity with respect to variations in the composition. As already stated above the preparation, when performed in an inert atmosphere instead of in a weakly oxidizing atmosphere, results in glasses with resistivities of substantially the same value.

It is also stated in the table, that the level of the resistivity is determined in the first instance by the iron content and then by the ratio $PbO/Fe_3O_4$.

What is claimed is:

1. A method of preparing glass which contains ferrous ions in addition to ferric ions, characterized in that for this purpose a mixture of the following composition in mol percent indicated as oxides, the total amount of ferrous oxide and ferric oxide being calculated as $Fe_3O_4$:

$B_2O_3$ ---------------------------------- 35–80
$Fe_3O_4$ ---------------------------------- 1–20
$Al_2O_3$ ---------------------------------- 2–15
$Na_2O$ ---------------------------------- 5–20
$PbO$ ---------------------------------- 5–20 where $$0.3 < \frac{PbO}{Na_2O} < 3.3$$

is melted in an inert to weakly oxidizing atmosphere.

2. The method of claim 1 wherein $B_2O_3$ is used in the form of boric acid, $Al_2O_3$ in the form of hydrous alumina and $Na_2O$ in the form of soda crystals.

3. The method of claim 1 wherein the mixture has the following composition in mol percent:

$B_2O_3$ ---------------------------------- 50–75
$Fe_3O_4$—1.5–6 $\Big\}$ $Al_2O_3 + Fe_3O_4$ ---------- 5–15
$Al_2O_3$— 3–15
$PbO$ ---------------------------------- 5–20
$Na_2O$ ---------------------------------- 5–20 where $$0.3 < \frac{PbO}{Na_2O} < 3.3$$

and in addition:

$$Pb \leqslant 4Fe_3O_4$$

References Cited by the Examiner

UNITED STATES PATENTS

| | | | |
|---|---|---|---|
| 2,480,166 | 8/1949 | Schwartzwalder et al. | 106—47 X |
| 3,203,815 | 8/1965 | Michael | 106—47 X |
| 3,258,434 | 6/1966 | Mackenzie et al. | 252—519 |

DONALL H. SYLVESTER, *Primary Examiner.*

F. W. MIGA, *Assistant Examiner.*